United States Patent [19]

Rounsaville et al.

[11] Patent Number: 5,695,604
[45] Date of Patent: Dec. 9, 1997

[54] METHOD FOR REPROCESSING AN OZONE-CONTAINING GAS PRESENT IN A PULP BLEACHING PLANT

[75] Inventors: Jeffrey Rounsaville, Milford; Shusuke Minami, Nashua, both of N.H.

[73] Assignee: Beloit Technologies, Inc., Beloit, Wis.

[21] Appl. No.: 693,919

[22] Filed: Aug. 5, 1996

[51] Int. Cl.$^6$ .................. D21C 9/153; B01D 53/66
[52] U.S. Cl. .................. 162/65; 162/51; 423/219; 423/220; 423/DIG. 3
[58] Field of Search .................. 423/219, 220, 423/DIG. 3; 162/51, 65

[56] References Cited

U.S. PATENT DOCUMENTS

| | | | |
|---|---|---|---|
| 2,830,870 | 4/1958 | Limerick | 162/51 |
| 4,287,130 | 9/1981 | Dohm et al. | 260/413 |
| 4,399,292 | 8/1983 | Rossi et al. | 549/431 |

FOREIGN PATENT DOCUMENTS

| | | |
|---|---|---|
| 570677 | 2/1959 | Canada .................. 162/51 |
| 0 526 383 A1 | 6/1992 | European Pat. Off. . |
| 0 588 704 A2 | 9/1993 | European Pat. Off. . |
| 818572 | 8/1959 | United Kingdom .................. 162/51 |
| WO 93/18226 | 6/1993 | WIPO . |
| WO 94/11570 | 5/1994 | WIPO . |

Primary Examiner—Gary P. Straub
Assistant Examiner—Timothy C. Vanoy
Attorney, Agent, or Firm—Hill, Steadman & Simpson

[57] ABSTRACT

A method for reprocessing an ozone-containing gas present in a pulp bleaching plant comprising the steps of supplying the ozone-containing gas to a scrubber and reducing the ozone concentration of the gas as the gas flows through the scrubber. The step of reducing comprises the steps of supplying an alkaline medium to the scrubber and flowing the ozone-containing gas in countercurrent relationship with the alkaline medium within the scrubber so as to provide intimate contact between the ozone-containing gas and the alkaline medium, thereby converting the ozone-containing gas into a substantially ozone-free gas. The alkaline medium may comprise one of the following: a sodium hydroxide solution; white liquor; post oxygen stage filtrate; weak black liquor; or filtrate from an Eo stage of the pulp bleaching plant. The method further comprises the step of separately discharging the ozone-containing gas and the alkaline medium from the scrubber. The ozone-containing gas may comprise an off-gas, which has been partially reacted with a pulp within a pulp bleaching stage or alternatively may comprise fresh bleaching gas, having an ozone concentration ranging from about 6% to about 14% by weight within a carrier gas, with the fresh bleaching gas being supplied directly from an ozone generator to the scrubber.

13 Claims, 1 Drawing Sheet

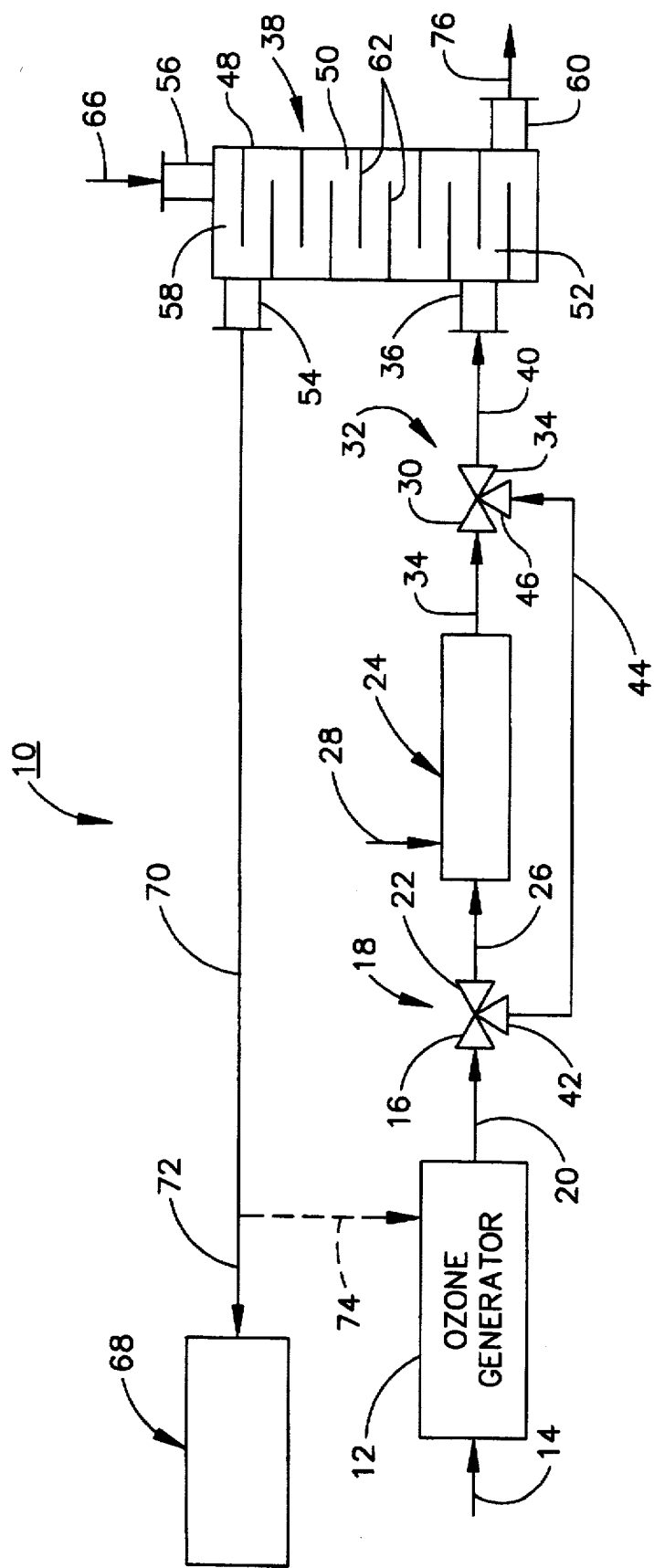

METHOD FOR REPROCESSING AN OZONE-CONTAINING GAS PRESENT IN A PULP BLEACHING PLANT

CROSS-REFERENCES

The subject application claims the priority benefits of U.S. Provisional patent application having Ser. No. 60/001,945 filed on Aug. 7, 1995 and entitled "Method Of Ozone Gas Destruction In Pulp Bleaching Applications".

BACKGROUND OF THE INVENTION

1.0 Field of the Invention

The present invention relates generally to the bleaching of lignocellulosic materials for use in the pulp and paper industry, and more particularly to a method for reprocessing an ozone-containing gas present in a pulp bleaching plant.

2.0 Related Art

Ozone gas has been used in a wide variety of industrial applications which has included water and waste treatment and certain semiconductor manufacturing processes. Additionally, there have been many recent efforts to utilize ozone as a bleaching reagent for wood pulp and other lignocellulosic materials, so as to avoid the use of chlorine (and the attendant environmental problems) in such bleaching processes. Although ozone may initially appear to be an ideal material for bleaching lignocellulosic materials, the exceptional oxidative properties of ozone and the relatively high cost associated with its use have limited the development of satisfactory devices and processes for ozone bleaching of lignocellulosic materials.

Ozone gas is very unstable, corrosive and is very toxic even in small concentrations. Environmental Protection Agency (EPA) air quality guidelines, indicate that the ozone concentration in the atmosphere should be less than 0.12 ppm by volume. Additionally, Occupational Safety and Health Administration (OSHA) guidelines stipulate that the allowable exposure of an individual to ozone for an eight hour period corresponds to a maximum ozone concentration in air of 0.1 ppm by volume. In situations where an ozone-containing gas is contained after process completion, the corrosive nature of ozone may create problems for subsequent use of the ozone-containing gas. Accordingly, in either situation it is desirable to destroy the residual ozone in the off-gas discharging from pulp bleaching stages in which the ozone has been reacted with pulp.

One known method for destroying residual ozone present in a wood pulp bleaching off-gas is thermal destruction. In this method, the ozone-containing off-gas is supplied to a thermal destruct unit where the ozone gas is heated, typically to a temperature greater than 350° C., so as to dissociate the ozone into diatomic oxygen. Another known method for the destruction of residual ozone has been the use of a solid catalyst which causes ozone to decompose. While these methods may be advantageously utilized in industrial applications using relatively small volumes of ozone-containing gas, they are subject to the following limitation when applied in pulp bleaching applications. The use of thermal methods to destroy ozone in pulp bleaching applications can be very expensive due to the relatively high gas volumes required in such applications and the corresponding significant electrical power required to operate the thermal destruct unit so as to destroy the residual ozone in the gas. Additionally, it is not uncommon for the flow of pulp within the pulp bleaching plant to be interrupted without warning, for a variety of reasons. In such instances, the thermal destruct unit may be required to process both the off-gas from the pulp bleaching process and additionally a volume of fresh bleaching gas, at a significantly higher concentration of ozone, from an ozone generator. Since the decomposition of ozone is exothermal, the sudden input of fresh bleaching gas can cause the internal temperature of the thermal destruct unit to increase rapidly. This in turn may result in severe thermal stresses on the thermal destruct unit which may result in component failure.

During the reaction of ozone with wood pulp, volatile organic compounds (VOC's) may be created which can poison the solid catalyst used to destroy residual ozone, thereby seriously impairing the effectiveness of the solid catalyst. Additionally, any residual pulp fibers present in the off-gas supplied to the solid catalyst bed may accumulate in the catalyst bed thereby restricting the gas flow and also reducing the gas-solids contact area.

The foregoing illustrates limitations known to exist in present methods of destroying residual ozone in ozone-containing gases used in wood pulp bleaching operations. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method for reprocessing an ozone-containing gas present in a pulp bleaching plant comprising the steps of:

supplying the ozone-containing gas to a scrubber;

reducing an ozone concentration of the ozone-containing gas as the gas flows through the scrubber, wherein the step of reducing comprises the steps of:
  supplying an alkaline medium to the scrubber;
  flowing the ozone-containing gas in countercurrent relationship with the alkaline medium within the scrubber so as to provide intimate contact between the ozone-containing gas and the alkaline medium within the scrubber, thereby converting the ozone-containing gas into a substantially ozone-free gas; wherein the method further comprises the step of separately discharging the substantially ozone-free gas and the alkaline medium from the scrubber.

BRIEF DESCRIPTION OF THE DRAWING

The foregoing and other aspects of the present invention will become more apparent from the subsequent Detailed Description of the invention when considered in conjunction with the accompanying drawing figure, wherein:

The FIGURE illustrates a portion of a pulp bleaching plant incorporating the method of the present invention for reprocessing an ozone-containing gas.

DETAILED DESCRIPTION

Referring now to the drawing, the FIGURE illustrates a portion of a pulp bleaching plant 10 for bleaching lignocellulosic materials, such as medium or high-consistency wood pulp, with a gaseous bleaching reagent comprising ozone according to the present invention. The pulp bleaching plant 10 is included in a pulp mill which also includes a brownstock washing plant (not shown) and an oxygen delignification plant (not shown), each of which precedes plant 10 within the pulp mill. As known in the art, wood pulp is obtained from a digestion of wood chips, from repulping of recycled paper or from other sources, and is commonly processed in pulp and paper mills, such as plant 10, in slurry form in water. As used herein, the term "consistency" is used to express the measured ratio of dry pulp fibers to water, or more specifically, the weight of dry pulp fibers in a given weight of pulp slurry or "pulp stock" as a percentage. Various definitions are used, such as air-dry consistency (a.d.%) or oven-dry consistency (o.d.%), or moisture-free consistency (m.f.%). The laboratory techniques for measuring these values can be found in references well known in the art, such as the TAPPI Standards Manual. Terms widely used to describe ranges of stock consistency useful in pulp and paper plants follow:

Low Consistency—below about 4–6% o.d.

Medium Consistency—about 9–18% o.d.

High Consistency—above about 18–20% o.d., but more commonly above about 25% o.d.

Pulp bleaching plant 10 includes a conventional ozone generator 12 which is effective for producing ozone in a carrier gas, such as oxygen or air. A feed gas 14 is supplied to the ozone generator and may comprise either air or an oxygen-enriched gas. As known in the art, due to the manner in which ozone is generated, ozone is typically available at a relatively low concentration within the carrier gas. Typically, with present technology commercially available ozone has a concentration ranging from about 6% to about 14%, by weight, when using oxygen as the carrier gas. As used herein, the term "off-gas" will refer to the mixture of ozone in an oxygen carrier gas, as well as other gases and vapors, such as gases which are produced as a by-product of the reaction of the ozone with the pulp, which are present at equilibrium conditions. The term "fresh bleaching gas" will be used to denote a mixture of ozone in an oxygen carrier gas, with an ozone concentration ranging from about 6% by weight to about 14% by weight, supplied from the ozone generator 12 which has not been reacted with the pulp and accordingly does not include reaction by-product gases.

The ozone-containing gas, comprising fresh bleaching gas, produced by ozone generator 12 is supplied from generator 12 to an inlet 16 of a valve indicated at 18, via a conduit 20. During normal operation of the pulp bleaching plant 10, the fresh bleaching gas discharges valve 18 through a first outlet 22 and is supplied to a pulp bleaching stage, indicated at 24, via a conduit 26. A wood pulp 28, which may comprise either medium or high consistency wood pulp, is also supplied to the pulp bleaching stage 24. The pulp bleaching stage comprises at least one, and may comprise a plurality of reactors (not shown), with at least a portion of the ozone in the fresh bleaching gas being reacted with the pulp within each of the reactors. Due to the reaction of the ozone with the pulp within the reactor or reactors of the pulp bleaching stage 24, the fresh bleaching gas supplied to the pulp bleaching stage 24 is converted into an off-gas which includes residual ozone which has not reacted with the pulp and by-product of reaction gases which includes carbon dioxide. The off-gas discharging from the pulp bleaching stage 24 is supplied to a first inlet 30 of a valve 32, via conduit 34. During normal operation of the pulp bleaching plant 10, the off-gas then discharges from the valve 32 through an outlet 34 of valve 32 and is supplied to a gas inlet 36 of a scrubber 38 via conduit 40, with the residual ozone being substantially completely destroyed within scrubber 38 as subsequently discussed in greater detail. The method for destroying the residual ozone within scrubber 38 constitutes a central feature of the present invention. During normal shut-down of the pulp bleaching plant 10, the fresh bleaching gas supplied from ozone generator 12 is allowed to purge through the pulp bleaching stage 24 where it is converted to off-gas having a relatively low ozone concentration and is then supplied to the inlet 36 of scrubber 38 via conduits 34 and 40 and valve 32. However, in certain instances when the flow of the wood pulp 28 to the pulp bleaching stage 24 is interrupted in a precipitous manner, the first outlet 22 of valve 18 is closed causing the fresh bleaching gas supplied from ozone generator 12 to flow through inlet 16 of valve 18 and discharge from valve 18 through a second outlet 42. The fresh bleaching gas then flows through a conduit 44 to a second inlet 46 of valve 32 so that the fresh bleaching gas by-passes the pulp bleaching stage 24. The fresh bleaching gas is then supplied to the gas inlet 36 of scrubber 38 via outlet 34 of valve 32 and conduit 40. Accordingly, in these situations, the concentration of ozone within the ozone-containing gas supplied to scrubber 38 may be significantly higher than the ozone concentration present in the off-gas supplied to scrubber 38 during normal operation and normal shut-down of plant 10.

Scrubber 38 is preferably substantially vertically oriented and includes a generally cylindrical housing 48 which forms an internal chamber 50 therewithin. As shown in The FIGURE, the gas inlet 36 of scrubber 38 is in fluid communication with a lower portion 52 of the internal chamber 50. Scrubber 38 further includes a gas outlet 54 and a liquid inlet 56, each of which are in fluid communication with an upper portion 58 of chamber 50, and a liquid outlet 60 which is in fluid communication with the lower portion 52 of chamber 50. In the illustrative embodiment shown in The FIGURE, scrubber 38 further includes a plurality of vertically spaced trays 62, with each of the trays 62 being attached to an inner wall of housing 48 and extending radially inwardly therefrom. Alternatively, the trays 62 may be omitted from scrubber 38 and replaced with a packing medium (not shown) which preferably comprises a plurality of rings, saddles, beads or balls made of materials resistant to ozone as well as the alkaline medium 66. However, other suitable packing media may be used as long as sufficient contact surface area is provided.

A flow of an alkaline medium 66 is supplied to the liquid inlet 56 of scrubber 38. The alkaline medium 66 preferably comprises one of the following: a sodium hydroxide solution; white liquor which is comprised mainly of sodium hydroxide, sodium sulfide and sodium carbonate; filtrate from an Eo stage (oxidative extraction stage not shown) of plant 10; post oxygen stage filtrate from the oxygen delignification plant which precedes plant 10; or brownstock washing filtrate supplied from the brownstock washing plant which precedes both the oxygen delignification plant and plant 10, with the brownstock washing filtrate alternatively referred to in the art as weak black liquor. The foregoing alkaline media are readily available from a variety of sources (not shown) within the associated pulp mill and each of the alkaline media has an alkali concentration ranging from about 1 gm of alkali/liter of solution to about 100 gms of alkali/liter of solution. The ozone-containing gas supplied to the gas inlet 36 of scrubber 38 flows upward through scrubber 38 while the alkaline medium 66 supplied to the liquid inlet 56 of scrubber 38 flows downward through scrubber 38 under the action of gravity. Accordingly, the ozone-containing gas and alkaline medium 66 flow in countercurrent relationship with one another within scrubber 38 so as to provide intimate contact between the ozone-containing gas and the alkaline medium 66 within scrubber 38. In the illustrative embodiment shown in The FIGURE, the flowpath of the ozone-containing gas and the alkaline medium 66 through scrubber 38 is established by the vertically spaced trays 62. Alternatively, when trays 62 are replaced with a packing medium, the flowpath of the ozone-containing gas and the alkaline medium 66 through scrubber 38 is determined by the packing medium. The use of the rings, saddles, beads or balls for the packing medium provides a very high surface area which facilitates intimate contact between the ozone-containing gas and the alkaline medium 66. Due to the intimate contact between the ozone-containing gas and the alkaline medium 66, the ozone present in the gas is substantially completely destroyed due to dissociation of the ozone into diatomic oxygen, thereby converting the ozone-containing gas into a substantially ozone-free gas. As a result, the substantially ozone-free gas discharging through gas outlet 54 of scrubber 38 has a reduced ozone concentration which meets allowable limits. As used herein, the term "substantially ozone-free gas" is intended to also encompass a gas which is free of ozone, at least within detectable limits as measured with conventional equipment. As a further advantage of the present invention, in the instances when the ozone-containing gas comprises the off-gas and the alkaline medium 66 comprises either a sodium hydroxide solution or white liquor, the intimate contact between the ozone-containing gas and the alkaline medium 66 within scrubber 38 results in any carbon dioxide present in the ozone-containing gas being substantially completely absorbed by the alkaline medium 66. The gas discharging scrubber 38 through outlet 54 may be supplied to a pulp bleaching stage 68 of plant 10 via conduits 70 and 72 or alternatively may be supplied, or recirculated to the ozone generator 12 via conduit 70 and a conduit 74 (shown in dashed line). It is noted that the pulp bleaching stage 68 may be disposed either upstream or downstream of the pulp bleaching stage 24 of plant 10. It is important to absorb the carbon dioxide if the off-gas is recirculated to ozone generator 12 to avoid an adverse impact on the efficiency of ozone generator 12 and it may also be advantageous to absorb any carbon dioxide present when the off-gas is supplied to pulp bleaching stage 68. For instance, stage 68 may comprise an Eo stage and the presence of any carbon dioxide may adversely affect the pulp processing in this stage. The alkaline medium discharges scrubber 38 through the liquid outlet 60 and may be supplied to other portions of the associated pulp mill for further processing as indicated by flow arrow 76.

The present invention provides a cost-efficient method for destroying residual ozone in an ozone-containing gas used in a pulp bleaching plant. The relatively high electrical cost associated with operation of known ozone thermal destruct units is avoided. As a further advantage, in some instances the method of the present invention also results in substantially complete absorption (by the alkaline medium) of any carbon dioxide which is present in the gas, which may not be achieved with the use of known thermal or catalytic destruct units. Furthermore, each of the alkaline media are commonly available from a variety of sources in the pulp mill which includes the pulp bleaching plant 10, which further enhances the cost-efficiency of the method of the present invention.

While the foregoing description has set forth the preferred embodiments of the present invention in particular detail, it must be understood that numerous modifications, substitutions and changes can be undertaken without departing from the true spirit and scope of the present invention as defined by the ensuing claims. The invention is therefore not limited to specific preferred embodiments as described, but is only limited as defined by the following claims.

We claim:

1. A method for reducing an ozone concentration in an ozone-containing gas present in a pulp bleaching plant, the method comprising the steps of:
    (1) continuously, supplying the ozone-containing gas to a first valve, the first valve being in communication with a pulp bleaching vessel and a bypass conduit, the first valve being open to the pulp bleaching vessel and closed to the bypass conduit when pulp is being supplied to the pulp bleaching vessel, the first valve being closed to the pulp bleaching vessel and open to the bypass conduit when pulp is not being supplied to the pulp bleaching vessel,
    supplying pulp to the pulp bleaching vessel and, performing steps (a) through (d):
        (a) flowing the ozone-containing gas into the pulp bleaching vessel to bleach the pulp and produce an ozone-containing off gas;
        (b) flowing the ozone-containing off gas from the bleaching vessel to a scrubber;
        (c) supplying an alkaline medium to the scrubber;
        (d) flowing the ozone-containing off gas in a counter-current relationship with respect to the alkaline medium within the scrubber so as to provide intimate contact between the ozone-containing off gas and the alkaline medium within the scrubber thereby substantially converting the ozone-containing off gas into a substantially ozone-free gas;
    if the supply of pulp is interrupted to the pulp bleaching vessel, performing steps (e) through (h):
        (e) flowing the ozone-containing gas into the bypass conduit;
        (f) flowing the ozone-containing gas from the bypass conduit to the scrubber;
        (g) supplying the alkaline medium to the scrubber;
        (h) flowing the ozone-containing gas in a countercurrent relationship with respect to the alkaline medium within the scrubber so as to provide intimate contact between the ozone-containing gas and the alkaline medium within the scrubber thereby substantially converting the ozone-containing gas into a substantially ozone-free gas;
    (2) separately discharging the substantially ozone-free gas and the alkaline medium from the scrubber.

2. The method as recited in claim 1, wherein the alkaline medium comprises a sodium hydroxide solution.

3. The method as recited in claim 1, wherein the alkaline medium comprises white liquor.

4. The method as recited in claim 1, wherein the alkaline medium comprises a post oxygen stage filtrate from an oxygen delignification process.

5. The method as recited in claim 1, wherein the alkaline medium comprises weak black liquor.

6. The method as recited in claim 1, wherein the alkaline medium comprises a filtrate from an Eo stage of the pulp bleaching plant.

7. The method as recited in claim 1, wherein the alkaline medium has an alkali concentration ranging from about 1 gm of alkali/liter of solution to about 100 gms of alkali/liter of solution.

8. The method as recited in claim 1, further comprising the step of:
    reducing the carbon dioxide concentration of the ozone-containing off-gas as the off-gas flows through the scrubber.

9. The method as recited in claim 1, wherein said step of separately discharging comprises the steps of:
   discharging the alkaline medium from a liquid outlet of the scrubber;
   discharging the substantially ozone-free gas from a gas outlet of the scrubber to an ozone generator.

10. The method as recited in claim 1, wherein said step of separately discharging comprises the steps of:
   discharging the alkaline medium from a liquid outlet of the scrubber;
   discharging the substantially ozone-free gas from a gas outlet of the scrubber to a pulp bleaching stage of the pulp bleaching plant.

11. The method as recited in claim 1, wherein:
   the scrubber is substantially vertically oriented and includes a generally cylindrical housing forming an internal chamber therein, the internal chamber having an upper portion and a lower portion, and the scrubber further includes a gas inlet and a liquid outlet in fluid communication with the lower portion of the internal chamber, and a gas outlet and a liquid inlet in fluid communication with the upper portion of the internal chamber;
   said step (b) further comprises flowing the ozone-containing off gas to the gas inlet of the scrubber;
   said step (f) further comprises flowing the ozone-containing gas to the gas inlet of the scrubber;
   said steps (c) and (g) further comprising supplying the alkaline medium to the liquid inlet of the scrubber;
   said step of separately discharging comprises the steps of:
      discharging the substantially ozone-free gas from the gas outlet of the scrubber; and
      discharging the alkaline medium from the liquid outlet of the scrubber.

12. The method of claim 1 wherein step (b) further comprises flowing the ozone-containing off gas to a second valve disposed opposite the bleaching vessel from the first valve, the second valve providing communication between the bleaching vessel and the scrubber, and, the bypass conduit and the scrubber, the second valve providing communication between the bleaching vessel and the scrubber when pulp is being supplied to the bleaching vessel, the second valve providing communication between the bypass line and the scrubber when pulp is not being supplied to the bleaching vessel.

13. The method of claim 12 wherein step (b) further comprising flowing the ozone-containing of gas to the second valve and step (f) further comprises flowing the ozone-containing gas to the second valve.

* * * * *

UNITED STATES PATENT AND TRADEMARK OFFICE
CERTIFICATE OF CORRECTION

PATENT NO. : 5,695,604
DATED : December 9, 1997
INVENTOR(S) : Jeffrey Rounsaville et al It is certified that error appears in the above-identified patent and that said Letters Patent is hereby corrected as shown below:

Col. 8, line 19, delete "line" and insert --conduit-- therefor.

Col. 8, line 22, delete "comprising" and insert --comprises-- therefor.

Signed and Sealed this

Thirty-first Day of August, 1999

Attest:

Q. TODD DICKINSON

Attesting Officer     Acting Commissioner of Patents and Trademarks